US012596394B2

(12) United States Patent
Blinzer et al.

(10) Patent No.: US 12,596,394 B2
(45) Date of Patent: Apr. 7, 2026

(54) SYSTEMS AND METHODS FOR ENABLING A FEATURE OF A SEMICONDUCTOR DEVICE

(71) Applicants: Advanced Micro Devices, Inc., Santa Clara, CA (US); ATI Technologies ULC, Markham (CA)

(72) Inventors: Paul Blinzer, Bellevue, WA (US); Maulik Ojas Mankad, Bangalore (IN); Victor Ignatski, Markham (CA); Ashish Jain, Austin, TX (US); Gia Phan, Markham (CA); Ranjeet Kumar, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 122 days.

(21) Appl. No.: 18/478,880

(22) Filed: Sep. 29, 2023

(65) Prior Publication Data

US 2025/0110525 A1     Apr. 3, 2025

(51) Int. Cl.
| | |
|---|---|
| *G06F 1/08* | (2006.01) |
| *G06F 21/64* | (2013.01) |
| *G06F 21/73* | (2013.01) |
| *H01L 23/525* | (2006.01) |

(52) U.S. Cl.
CPC ................ G06F 1/08 (2013.01); G06F 21/64 (2013.01); G06F 21/73 (2013.01); H01L 23/5256 (2013.01)

(58) Field of Classification Search
CPC . G06F 1/08; G06F 21/64; G06F 21/73; H01L 23/5256
See application file for complete search history.

(56) References Cited

U.S. PATENT DOCUMENTS

| | | | | |
|---|---|---|---|---|
| 6,385,735 | B1 * | 5/2002 | Wilson ...................... | G06F 1/08 713/601 |
| 7,382,366 | B1 * | 6/2008 | Klock ..................... | G06F 11/24 714/E11.154 |
| 7,795,899 | B1 * | 9/2010 | Grohoski ............... | G11C 17/16 326/38 |
| 9,954,516 | B1 * | 4/2018 | Li ............................. | G06F 1/08 |
| 11,531,476 | B2 * | 12/2022 | Choi ...................... | G06F 9/4401 |
| 2007/0081620 | A1 * | 4/2007 | Beattie .................... | H03L 7/104 375/376 |
| 2007/0250219 | A1 * | 10/2007 | Gaskins .................. | G06F 1/324 713/320 |
| 2008/0030243 | A1 * | 2/2008 | Liao ........................ | G11C 17/16 327/113 |
| 2008/0061817 | A1 * | 3/2008 | Erickson ................. | G06F 30/34 326/8 |
| 2009/0239500 | A1 * | 9/2009 | Aripirala ............... | H04W 12/50 455/410 |
| 2010/0223489 | A1 * | 9/2010 | Huang ..................... | G06F 1/08 713/300 |

(Continued)

*Primary Examiner* — Aurel Prifti
(74) *Attorney, Agent, or Firm* — Greenberg Traurig, LLP

(57) ABSTRACT

A computer-implemented method for enabling a feature of a semiconductor device can include receiving, by at least one processor of a semiconductor device, a command to enable a feature of the semiconductor device. The method can also include burning, by the at least one processor and in response to the command, an electronic fuse of the semiconductor device. Various other methods, systems, and computer-readable media are also disclosed.

20 Claims, 6 Drawing Sheets

(56)             References Cited

U.S. PATENT DOCUMENTS

| | | | |
|---|---|---|---|
| 2011/0161706 A1* | 6/2011 | Huang .................. | G06F 1/3203 |
| | | | 713/323 |
| 2014/0189365 A1* | 7/2014 | Cox ........................ | G06F 21/72 |
| | | | 713/189 |
| 2021/0109562 A1* | 4/2021 | Ragland .................. | G06F 1/324 |
| 2024/0184890 A1* | 6/2024 | Agarwal .............. | G06F 21/575 |
| 2024/0220159 A1* | 7/2024 | Fang ..................... | G06F 3/0679 |
| 2024/0427368 A1* | 12/2024 | Koorapati ................. | G06F 1/08 |

* cited by examiner

200

500

600

650

SYSTEMS AND METHODS FOR ENABLING A FEATURE OF A SEMICONDUCTOR DEVICE

BACKGROUND

Features of semiconductor devices, such as graphics application-specific integrated circuits (ASICs), can be enabled by end users in various circumstances. For example, customers can purchase products having features that can be enabled for an additional fee or subscription. Another example can relate to overclocking of a graphics ASIC, which can often be accompanied by overvolting to cause the graphics ASIC to perform more stably at higher frequency.

Substantial overclocking of a graphics ASIC can be caused by an end user employing an overclocking utility on the user's device. Operating the graphics ASIC in such a manner can affect the reliability or lifetime of the product, causing increased return of the product and reputational damage to the manufacturer without reliable evidence that the end user chose to exceed normal operating conditions for the product. However, enthusiasts often overclock graphics ASICs to further increase performance of the product outside the boundaries specified in the product warranty.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
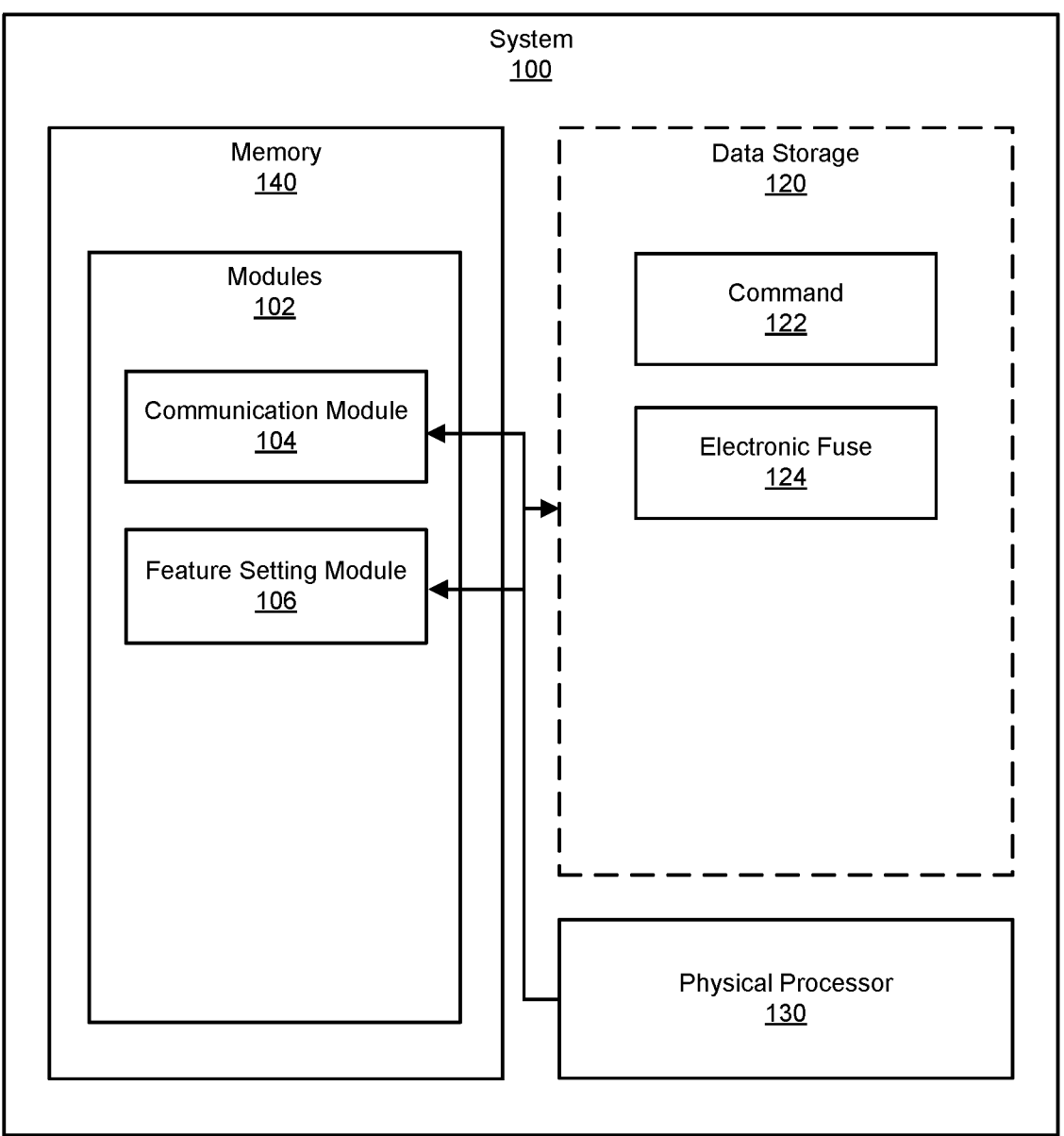
FIG. 1 is a block diagram of an example system for enabling a feature of a semiconductor device.

Throughout the drawings, identical reference characters and descriptions indicate similar, but not necessarily identical, elements. While the example implementations described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for enabling a feature of a semiconductor device. For example, by receiving a command to enable a feature (e.g., overclocking) of a semiconductor device (e.g., graphics processing unit (GPU)) and responding to the command by burning an electronic fuse of the semiconductor device, a trusted microprocessor (e.g., hardware root of trust) of the semiconductor device can permanently mark the semiconductor device as user-enabled for the feature and also enable the feature. In some implementations, this capability can be realized using an application (e.g., overclocking utility) that receives a user selection to enable the feature (e.g., overclocking the GPU at the expense of voiding the GPU warranty). Then the application can securely communicate with the trusted microprocessor and a network accessible secure service to obtain an authorization (e.g., certificate) as well as the command and relay the command to the trusted microprocessor. Once the feature has been enabled, a kernel mode driver of a user device that includes the semiconductor device can provide the feature based on a state of the burned fuse and the authorization provided to the application. In this way, the disclosed systems and methods can avoid employing overly restrictive security mechanisms on end-user-systems while providing a more robust and secure solution than can be realized using end-user system local software.

In one example, a computing device can include communication circuitry configured to receive a command to enable a feature of a semiconductor device and feature setting circuitry configured to respond to receipt of the command by burning an electronic fuse of the semiconductor device.

Another example can be the previously described example computing device, wherein burning the electronic fuse permanently marks the semiconductor device as user-enabled for the feature.

Another example can be any of the previously described example computing devices, wherein burning the electronic fuse enables the feature.

Another example can be any of the previously described example computing devices, wherein the computing device corresponds to a hardware root of trust of the semiconductor device.

Another example can be any of the previously described example computing devices, wherein the computing device receives the command by interacting, via an application configured to provide the feature, with a network accessible secure service.

Another example can be any of the previously described example computing devices, wherein the network accessible secure service is configured to establish a secure connection with an operating system that communicates with the semiconductor device and that runs the application, use a cryptographic signature to validate an integrity of a software infrastructure dealing with a setting of the feature as user-enabled, receive a user selection to enable the feature from the application, and securely instruct the computing device to burn the electronic fuse.

Another example can be any of the previously described example computing devices, wherein the semiconductor device corresponds to a graphics processing unit and the feature corresponds to overclocking of the graphics processing unit.

In one example, a system can include a semiconductor device that includes a trusted microprocessor and an electronic fuse, and an operating system in communication with the semiconductor device and configured to run an application that provides a feature of the semiconductor device, wherein the trusted microprocessor is configured to receive a command to enable the feature of the semiconductor device and respond to receipt of the command by burning the electronic fuse.

Another example can be the previously described example system, wherein burning the electronic fuse permanently marks the semiconductor device as user-enabled for the feature.

Another example can be any of the previously described example systems, wherein burning the electronic fuse enables the feature.

Another example can be any of the previously described example systems, wherein the trusted microprocessor corresponds to a hardware root of trust of the semiconductor device.

Another example can be any of the previously described example systems, wherein the trusted microprocessor receives the command by interacting, via the application, with a network accessible secure service.

Another example can be any of the previously described example systems, wherein the network accessible secure service is configured to establish a secure connection with the operating system, use a cryptographic signature to validate an integrity of a software infrastructure dealing with a setting of the feature as user-enabled, receive a user selection to enable the feature from the application, and securely instruct the trusted microprocessor to burn the electronic fuse.

Another example can be any of the previously described example systems, wherein the semiconductor device corresponds to a graphics processing unit and the feature corresponds to overclocking of the graphics processing unit.

In one example, a computer-implemented method can include receiving, by at least one processor of a semiconductor device, a command to enable a feature of the semiconductor device and burning, by the at least one processor and in response to the command, an electronic fuse of the semiconductor device.

Another example can be the previously described example computer-implemented method, wherein burning the electronic fuse permanently marks the semiconductor device as user-enabled for the feature.

Another example can be any of the previously described example computer-implemented methods, wherein burning the electronic fuse enables the feature.

Another example can be any of the previously described example computer-implemented methods, wherein the at least one processor corresponds to a hardware root of trust of the semiconductor device.

Another example can be any of the previously described example computer-implemented methods, wherein the at least one processor receives the command by interacting, via an application configured to provide the feature, with a network accessible secure service.

Another example can be any of the previously described example computer-implemented methods, wherein the network accessible secure service is configured to establish a secure connection with an operating system that communicates with the semiconductor device and that runs the application, use a cryptographic signature to validate an integrity of a software infrastructure dealing with a setting of the feature as user-enabled, receive, from the application, a user selection to enable the feature, and securely instruct the at least one processor to burn the electronic fuse.

Figure 2:
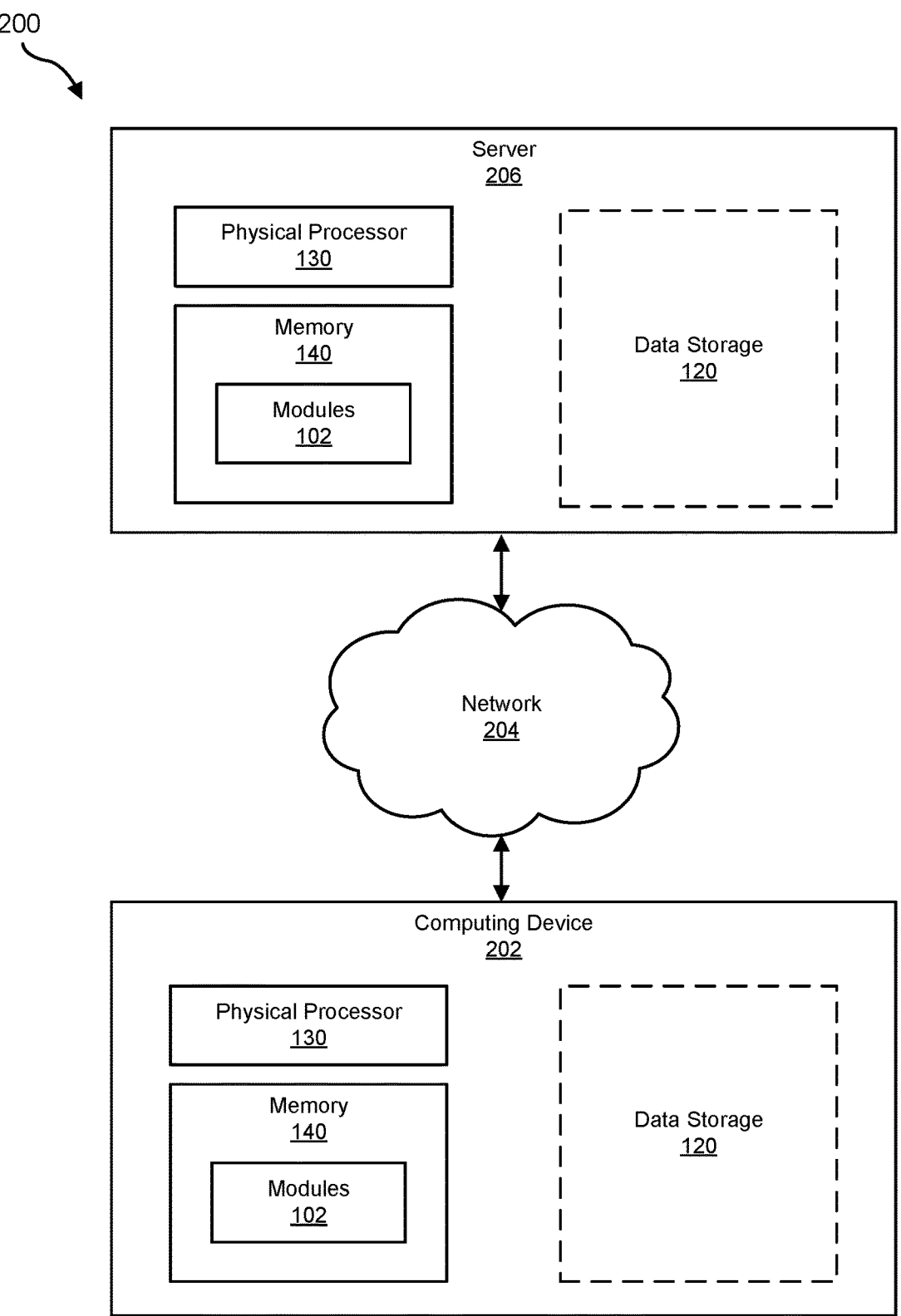
FIG. 2 is a block diagram of an additional example system for enabling a feature of a semiconductor device.

The following will provide, with reference to FIGS. 1-2, detailed descriptions of example systems for enabling a feature of a semiconductor device. Detailed descriptions of corresponding computer-implemented methods will also be provided in connection with FIG. 3. In addition, detailed descriptions of example systems and methods for enabling a feature of a semiconductor device will be provided in connection with FIGS. 4-6.

FIG. 1 is a block diagram of an example system 100 for enabling a feature of a semiconductor device. As illustrated in this figure, example system 100 can include one or more modules 102 for performing one or more tasks. As will be explained in greater detail below, modules 102 can include a communication module 104 and a feature setting module 106. Although illustrated as separate elements, one or more of modules 102 in FIG. 1 can represent portions of a single module or application.

In certain implementations, one or more of modules 102 in FIG. 1 can represent one or more software applications or programs that, when executed by a computing device, can cause the computing device to perform one or more tasks. For example, and as will be described in greater detail below, one or more of modules 102 can represent modules stored and configured to run on one or more computing devices, such as the devices illustrated in FIG. 2 (e.g., computing device 202 and/or server 206). One or more of modules 102 in FIG. 1 can also represent all or portions of one or more special-purpose computers configured to perform one or more tasks.

As illustrated in FIG. 1, example system 100 can also include one or more memory devices, such as memory 140. Memory 140 generally represents any type or form of volatile or non-volatile storage device or medium capable of storing data and/or computer-readable instructions. In one example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130. Physical processor 130 generally represents any type or form of hardware-implemented processing unit capable of interpreting and/or executing computer-readable instructions. In one example, physical processor 130 can access and/or modify one or more of modules 102 stored in memory 140. Additionally or alternatively, physical processor 130 can execute one or more of modules 102 to facilitate enabling a feature of a semiconductor device. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

The term "modules," as used herein, can generally refer to one or more functional components of a computing device. For example, and without limitation, a module or modules can correspond to hardware, software, or combinations thereof. In turn, hardware can correspond to analog circuitry, digital circuitry, communication media, or combinations thereof. In some implementations, the modules can be implemented as microcode (e.g., a collection of instructions running on a micro-processor, digital and/or analog circuitry, etc.) and/or one or more firmware in a graphics processing unit. For example, a module can correspond to a GPU, a trusted micro-processor of a GPU, and/or a portion thereof (e.g., circuitry (e.g., one or more device features sets and/or firmware) of a trusted micro-processor).

As illustrated in FIG. 1, example system 100 can also include one or more instances of stored data, such as data storage 120. Data storage 120 generally represents any type or form of stored data, however stored (e.g., signal line transmissions, bit registers, flip flops, software in rewritable memory, configurable hardware states, combinations thereof, etc.). In one example, data storage 120 includes databases, spreadsheets, tables, lists, matrices, trees, or any other type of data structure. Examples of data storage 120 include, without limitation, command 122 and electronic fuse 124.

Example system 100 in FIG. 1 can be implemented in a variety of ways. For example, all or a portion of example system 100 can represent portions of example system 200 in FIG. 2. As shown in FIG. 2, system 200 can include a computing device 202 in communication with a server 206 via a network 204. In one example, all or a portion of the functionality of modules 102 can be performed by computing device 202, server 206, and/or any other suitable computing system. As will be described in greater detail below, one or more of modules 102 from FIG. 1 can, when executed by at least one processor of computing device 202 and/or server 206, enable computing device 202 and/or server 206 to enable a feature of a semiconductor device.

Computing device 202 generally represents any type or form of computing device capable of reading computer-executable instructions. In some implementations, computing device 202 can be and/or include one or more graphics processing units having a chiplet processor and/or a trusted microprocessor thereof (e.g., a hardware root of trust). Additional examples of computing device 202 include, without limitation, platforms such as laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device. Alternatively or additionally, computing device 202 can correspond to a device operating within such a platform.

Server 206 generally represents any type or form of platform that provides cloud service (e.g., cloud gaming server) that includes one or more computing devices 202. In some implementations, server 206 can be and/or include a cloud service (e.g., cloud gaming server) that includes one or more graphics processing units having a chiplet processor connected by a switch fabric. Additional examples of server 206 include, without limitation, storage servers, database servers, application servers, and/or web servers configured to run certain software applications and/or provide various storage, database, and/or web services. Although illustrated as a single entity in FIG. 2, server 206 can include and/or represent a plurality of servers that work and/or operate in conjunction with one another.

Network 204 generally represents any medium or architecture capable of facilitating communication or data transfer. In one example, network 204 can facilitate communication between computing device 202 and server 206. In this example, network 204 can facilitate communication or data transfer using wireless and/or wired connections. Examples of network 204 include, without limitation, a Peripheral Component Interconnect express (PICe) bus, a Nonvolatile memory express (Nvme) bus, a Local Area Network (LAN), a Personal Area Network (PAN), Power Line Communications (PLC), portions of one or more of the same, variations or combinations of one or more of the same, or any other suitable network that enables the computing device 202 to perform data communication with other components on the platform of server 206. In other examples, network 204 can be an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to system 100 in FIG. 1 and/or system 200 in FIG. 2. Conversely, all of the components and devices illustrated in FIGS. 1 and 2 need not be present to practice the implementations described and/or illustrated herein. The devices and subsystems referenced above can also be interconnected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
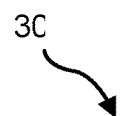
FIG. 3 is a flow diagram of an example method for enabling a feature of a semiconductor device.
Figure 3:
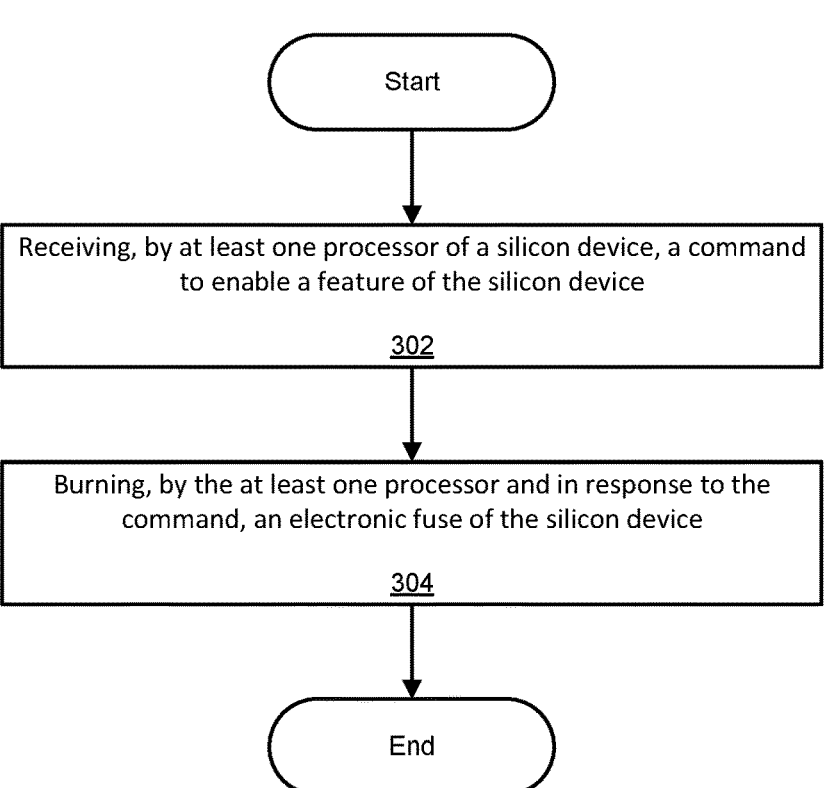

FIG. 3 is a flow diagram of an example computer-implemented method 300 for enabling a feature of a semiconductor device. The steps shown in FIG. 3 can be performed by any suitable computer-executable code and/or computing system, including system 100 in FIG. 1, system 200 in FIG. 2, and/or variations or combinations of one or more of the same. In one example, each of the steps shown in FIG. 3 can represent an algorithm whose structure includes and/or is represented by multiple sub-steps, examples of which will be provided in greater detail below.

The term "computer-implemented method," as used herein, can generally refer to a method performed by hardware or a combination of hardware and software. For example, hardware can correspond to analog circuitry, digital circuitry, communication media, or combinations thereof. In some implementations, hardware can correspond to digital and/or analog circuitry arranged to carry out one or more portions of the computer-implemented method. In some implementations, hardware can correspond to physical processor 130 of FIG. 1. Additionally, software can correspond to software applications or programs that, when executed by the hardware, can cause the hardware to perform one or more tasks that carry out one or more portions of the computer-implemented method. In some implementations, software can correspond to one or more of modules 102 stored in memory 140 of FIG. 1

As illustrated in FIG. 3, at step 302 one or more of the systems described herein can receive a command. For example, communication module 104 can, as part of computing device 202 in FIG. 2, receive a command to enable a feature of a semiconductor device.

The term "command," as used herein, can generally refer to a directive to a computer program and/or circuitry to perform a specific task. For example, and without limitation, a command can be a message containing an authorization provided by a secure service over a network. Such a command can be received directly and/or indirectly. For example, and without limitation, a command can be issued by a secure service over a network, relayed by an application for providing the feature of the semiconductor device, further relayed by a kernel mode driver of the semiconductor device, and ultimately received and acted upon by a trusted microprocessor (e.g., hardware root of trust, platform secure processor (PSP), etc.) of the semiconductor device.

The term "enable," as used herein can generally refer to making a feature operational or activating a feature. For example, and without limitation, enabling a feature can correspond to toggling a software setting, actuating a hardware button, placing a jumper, etc. In this context, enabling the feature can correspond to permanently recording a discoverable status that triggers activation of the feature.

The term "semiconductor device," as used herein, can generally refer to an electronic component that relies on the electronic properties of a semiconductor material for its function. For example, and without limitation, semiconductor material of the device can include silicon, germanium, gallium arsenide, and/or organic material. Example semiconductor devices can include graphics processing units (GPUs), accelerator processing units (ACUs), central processing units (CPUs), arithmetic and logic units (ALUs), motherboards, microprocessors, sound chips, sound cards, network cards, deep learning processors, physical processing units (PPUs), field programmable gate arrays (FPGAs), synergistic processing units (SPUs), synergistic processing elements (SPEs), etc.

The systems described herein can perform step 302 in a variety of ways. In one example, communication module 104 can, as part of computing device 202 in FIG. 2, receive the command by interacting, via an application configured to provide the feature, with a network accessible secure service. In some examples, the network accessible secure service can be configured to establish a secure connection with an operating system in communication with the semiconductor device and running the application. Alternatively or additionally, the network accessible secure service can be configured to use a cryptographic signature to validate an integrity of a software infrastructure dealing with a setting of the feature as user-enabled. In some implementations, the network accessible secure service can provide the application with authorization (e.g., a certificate, a hash, etc.) validating the application to a kernel mode driver of a central processing unit that employs the semiconductor device. Alternatively or additionally, the network accessible secure service can be configured to receive, from the application, a user selection to enable the feature. Alternatively or additionally, the network accessible secure service can be configured to securely instruct the at least one processor to burn the electronic fuse.

At step 304 one or more of the systems described herein can burn a fuse. For example, feature setting module 106 can, as part of computing device 202 in FIG. 2, respond to the command by burning an electronic fuse of the semiconductor device.

The term "electronic fuse," as used herein, can generally refer to any mechanism capable of permanently recording a discoverable status. For example, and without limitation, an electronic fuse can be an eFuse and/or write once read many (WORM) memory integral to the semiconductor device. In this context, an eFuse can be a dedicated electronic circuit and a WORM can be a programmable read only memory (ROM), a serial peripheral interface (SPI) ROM (e.g., flash memory), etc. The electronic fuse can be integral to the semiconductor device, for example, by being included in the semiconductor device (e.g., transistor layer) and/or in a package of the semiconductor device. In this context, burning an electronic fuse can correspond to activating (e.g., tripping, triggering, toggling, shorting, opening, actuating, flipping, flopping, etc.) an eFuse and/or setting one or more bits and/or memory cells in a WORM memory.

The systems described herein can perform step 302 in a variety of ways. In one example, burning the electronic fuse can permanently mark the semiconductor device as user-enabled for the feature. In some implementations, the electronic fuse can be an integrated memory (e.g., flash memory) of the semiconductor device. Alternatively or additionally, burning the electronic fuse can enable the feature. In some implementations, the kernel mode driver of a central processing unit can communicate with the computing device to confirm that the fuse is burned and provide the feature at least partly in response to the confirmation that the fuse is burned. In some implementations, the kernel mode driver can further communicate with the application to confirm that the application is authorized and provide the feature further in response to the confirmation that the application is authorized. In some implementations, the computing device can be a trusted microprocessor (e.g., hardware root of trust) of the semiconductor device. In some implementations, the semiconductor device can be a GPU.

Figure 4:
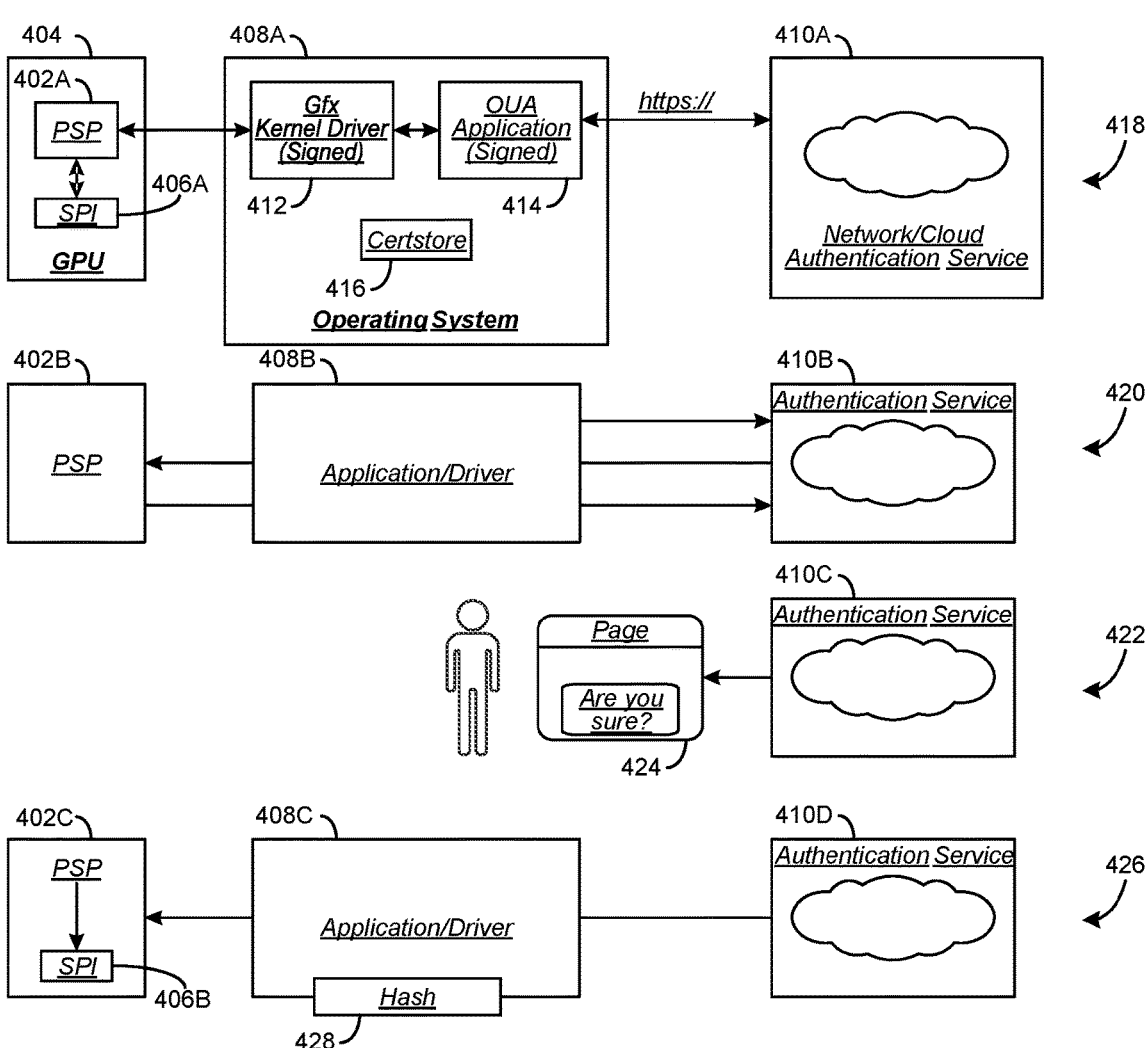
FIG. 4 is a block diagram of example system components and high level data flows for burning an electronic fuse of a semiconductor device.
Figure 5:
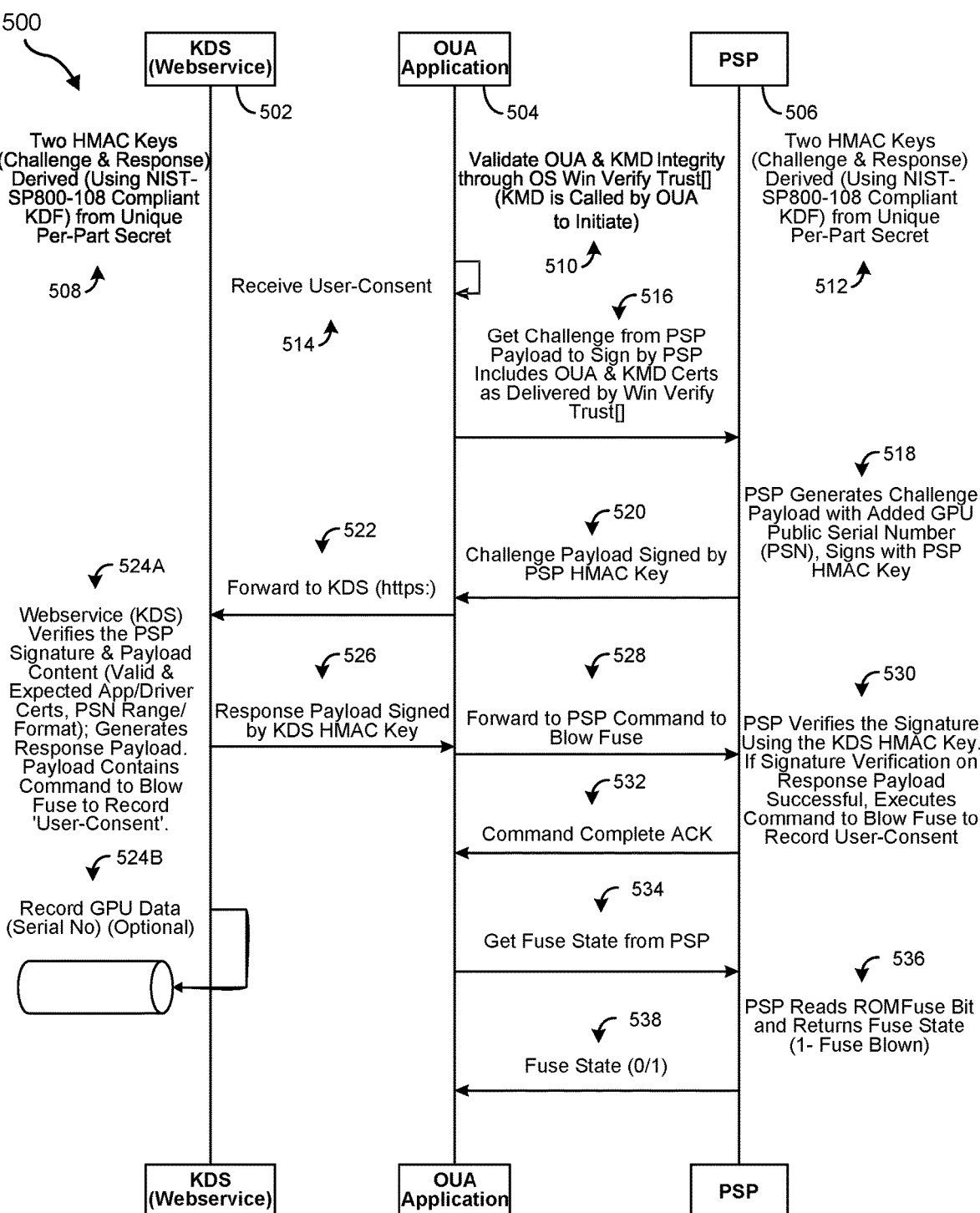
FIG. 5 is a flow diagram of example methods for burning an electronic fuse in response to user authorization.
Figure 6:
FIG. 6 is a block diagram of example systems for enabling a feature of a semiconductor device.
Figure 6:
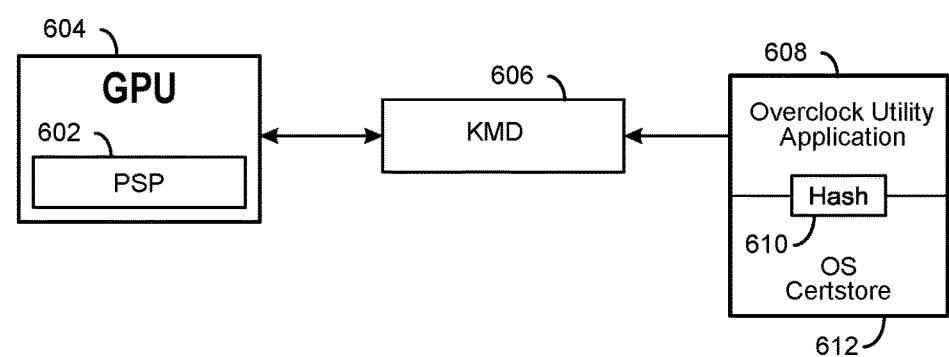
Figure 6:
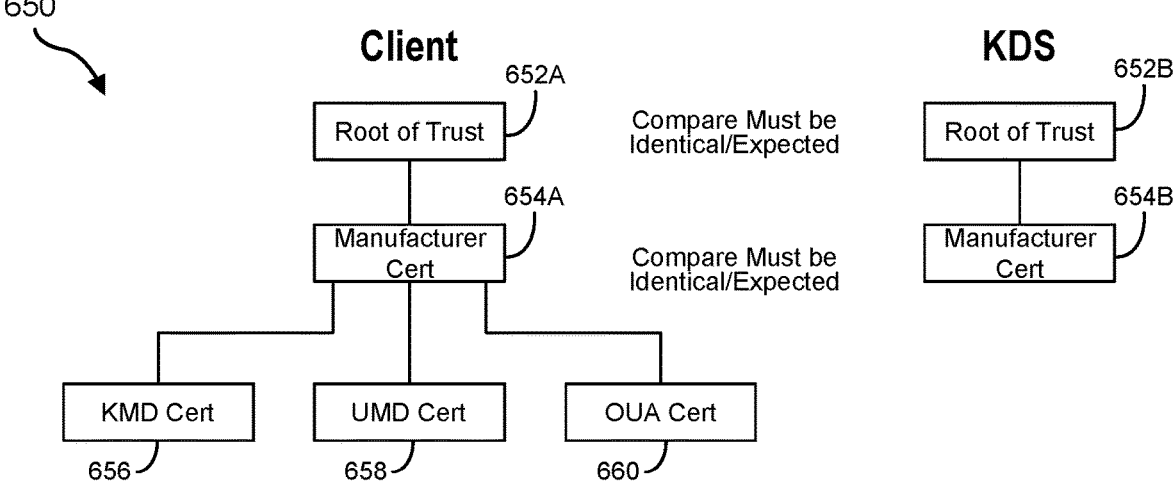

FIGS. 4-6 detail example systems and methods for enabling a feature of a semiconductor device in which the semiconductor device corresponds to a GPU and the feature corresponds to overclocking the GPU. However, it should be understood that other types of features (e.g., additional processing power, additional memory, additional functionality, etc.) of GPUS and/or other types of semiconductor devices (CPUs, Internet of Things (IOT) devices, etc.) can be enabled by the systems and methods described herein.

The systems and methods disclosed with reference to FIGS. 4-6 are intended to prevent enabling extreme overclock (which can substantially affect the reliability and lifetime of the product) that is not detectable, acknowledged or even authorized by the owner/end user of the product. Any non-manufacturer approved application to change this Extreme OC board state, and any attempts to control the enabling or setting parameters to control the mechanisms, can be detectable and prevented by the design.

Scenarios where this information can be relevant include return material authorization (RMA) handling and/or buying refurbished or used products that have been severely overclocked for extended periods of time and may affect the remaining usable lifetime. Recording the overclock avoids reputation issues or other negative outcomes if the extreme overclocking state is not identifiable.

The design can be based on various requirements that can be used in various combinations. For example, a requirement can be that extreme overclocking can only be performed using a mechanism (e.g., network accessible secure service) authorized by a manufacturer of the semiconductor device and an application (e.g., overclocking utility) authorized by the manufacturer of the semiconductor device. Another requirement can be that enablement of extreme overclocking be performed by a user of the system with appropriate authority (e.g., at minimum Power User or Administrator level). An additional requirement can be that user privilege running the enablement procedure can be determined by an application manifest. A further requirement can be that the mechanism is protected against replay attacks by utilizing challenge-derived information in the response payload to the web service.

Still other requirements can be used in various combinations with the requirements described above. For example, a requirement can be that the user choice and the graphics board identifying information (e.g., GPU, memory, serial number, application certificate, driver certificate, etc.) can be recorded anonymously at the manufacturer of the semiconductor device to avoid a requirement to log personal information. Another requirement can be that the mechanism is not dependent on logging the information, but logging can be added if it turns out that RMAs are beyond expectations and a data trail and connection needs to be established to align RMAs with extreme overclocking enabled board enablements. An additional requirement can be that the GPU's platform secure processor (PSP) (e.g., trusted microprocessor, hardware root of trust, etc.) be configured to permanently record the user's overclocking choice in GPU/PSP electronic fuses (e.g., eFuses). If eFuses are not present, the information can update other persistent data (e.g., on the board's serial peripheral interface (SPI) read only memory (ROM)). The status of the enablement can be queried and prominently displayed in a settings application (e.g., Radeon Settings application) authorized by the manufacturer of the semiconductor device. This settings application can be used to set the overclocking parameters and can allow for a local validation of the tool's authenticity.

The disclosed systems and methods can avoid specifically addressing any hardware attack models (e.g., SPI ROM attack via joint test action group (JTAG) in case SPI ROM is used for storage of information instead of eFuses) or some sophisticated Windows OS kernel mode attack scenarios. Instead, the disclosed systems and methods can focus on threat models with sophisticated user mode centric local software attacks to the machine as can be expected during installation of a physical adapter, without any hardware tools. In some implementations, the disclosed systems can be used for both permanently enabling extreme overclocking and later to set the overclocking parameters. As far as the architectural design and enablement/control flow is concerned, these can be handled as two separate, distinct steps of the communication, with their own levels of application authentication and robustness considerations.

To provide the user interface mechanics to enable extreme overclocking, the disclosed systems and methods can use a trusted external component under control of the manufacturer of the semiconductor device. This trusted external component can be, for example, a web service (e.g., a network accessible secure service) based on key distribution services (KDS). The communication channel from the local system to the web service can be established through the hypertext transfer protocol secure (https) web protocol.

KDS is a stateless web authorization service. As implemented by the disclosed systems and methods, its purpose can be to verify that a request originates from a trusted board component (e.g., PSP) and to externally validate the overclocking utility application and kernel mode driver (KMD) integrity as determined through the Windows OS WinVerifyTrust( ) Certificate information can be part of the PSP-generated challenge payload and can be independently validated on the KDS side, at minimum through explicit check, and certificates can be further independently affirmed through the Verisign root of trust chain resolution. In this way, KDS can externally validate the overclocking utility application (OUA) and KMD integrity with the endpoint providing information about the local system configuration and the end user manual response in an OUA confirmation message, if the OUA is proceeding the device through the enablement sequence.

The above approach can avoid retaining sensitive information in the OUA client application or the KMD driver and the need for both to be specifically hardened against malicious attack attempts, as there is no sensitive persistent information in either of these components. The web service mechanism also has the advantage that, in a future design and as RMA considerations warrant, a readily accessible log located at the manufacturer of the semiconductor device can be introduced without substantial data flow changes. In that scenario, a web based service also allows a "when and where" identification (e.g., due to global time base and IP geolocation) and can identify if a particular IP address has a high rate of enablement. Such a high rate of enablement can indicate that a System Integrator or ODM is performing the enablement versus an end-user authorized overclock authorization.

FIG. 4 illustrates example system components 400 and high level data flows for enabling a feature of a semiconductor device as described above. For example, PSP 402A-404C of a GPU 404 having a SPI ROM 406A and 406B can communicate with a network/cloud authentication service 410A-410D via an operating system 408A-408C hosting a KMD 412, an OUA 414, and a certificate store 416. In this way, authentication service 410A can establish a secure connection with operating system 408A in communication with the GPU 404 and running the OUA 414. For example, and as shown at 418, OUA 414 can establish a network connection (e.g., via http) with authentication service 410A and also can communicate with KMD 412. In turn, KMD 412 can communicate with PSP 402A which can communicate with SPI ROM 406A. As shown at 420, authentication service 410B, operating system 408B, and PSP 402B can exchange messages to allow authentication service 410B to use a cryptographic signature to validate an integrity of a software infrastructure dealing with a setting of the feature as user-enabled. For example, authentication service 410B can validate signatures provided to KMD 412 and OUA 414 by the manufacturer of GPU 404. Once the software infrastructure has been validated, authentication service 410C can, as shown at 422, utilize OUA 414 to serve a webpage 424 that queries a user to confirm the user selection to enable overclocking of GPU 404 (e.g., with a notification that doing so will void a warranty) and provides a prompt responsive to user input to provide this confirmation. Upon receiving the confirmation of the user selection from OUA 414 over the secure connection, authentication service 410D, as shown at 426, can provide a hash 428 to the OUA 414 that is stored in certificate store 416, and authentication service 410D can securely instruct PSP 402C to burn the electronic fuse in SPI ROM 406B.

Communication of the OUA and/or web service communicating with the PSP, as discussed herein, can imply that the web service is using the application, establishing the secure connection, and utilizing the KMD as an untrusted transport layer to communicate between the KDS service and the PSP. The example implementation can use the Windows based Authenticode mechanisms to establish the origin and integrity of the locally installed OUA and driver binaries and root these to an Authenticode Trust provider (e.g., Verisign, Thawte, etc.).

The actual extreme overclock enablement can be enabled only after it is authorized through a secured channel between the PSP and the web service (e.g., via endpoint signed transfer packets). The communication can be initiated and managed by the OUA and/or KMD as an intermediary. Neither the OUA nor the KMD stores any private keys or other attackable secrets, and the OUA and KMD can be configured to leverage only a Windows based infrastructure for these keys/secrets (e.g., for https traffic). The OUA and KMD can be aware of the communication content itself but can be prevented from modifying it without being detected by the trusted endpoints. Therefore, the enablement protocol can prevent a local only authorization of burning the electronic fuse without a previous KDS visible communication.

FIG. 5 illustrates a detailed communication flow 500 used to burn an electronic fuse in response to user authorization. For example, KDS 502, OUA 504, and PSP 506 can participate in the communication flow in any manner described herein. At 508, KDS 502 can perform a challenge and response procedure using two hash-based message authentication code HMAC keys derived from a unique per-part secret (e.g., using a NIST-SP800-108 compliant KDF). At 510, OUA 504 can call the KMD to initiate validation of OUA 504 and KMD integrity through Windows OS WinVerifyTrust( ) as previously described. At 512, PSP 506 can participate in the validation using the two HMAC keys derived from the unique per-part secret. For example, to set up the communication with the web service, OUA 504 can establish the secure communication channel between PSP 506 and KDS 502 by initiating a trigger for a challenge/response communication between PSP 506 and KDS 502. OUA 504 can initiate this trigger after initiating some Windows based integrity validation mechanisms for application authentication via a KMD. To establish the KDS 502 communication securely, the application may use a web browser subprocess. To address firewall concerns, an https based transport protocol can be used.

After the channel creation response is accepted and the channel is established, OUA 504 can present an interactive message page where the user is expected to authorize the extreme overclocking enablement. To ensure that this authorization is not performed through an automated service/robot, the application can introduce a "human challenge." Example human challenges can include passive tracking of "brownian motion" mouse movements, which can indicate a physical device, and/or by using variable keyboard input timings that trigger the accept to check actual human input.

Upon receiving user consent at 514, OUA 504 can, at 516, message PSP 506 to generate a challenge payload including OUA and KMD certificates as delivered by Windows OS WinVerifyTrust( ) At 518, PSP 506 can respond to this message by generating the challenge payload having an added GPU public serial number (PSN) (e.g., signed with a PSP HMAC key) and, at 520, transmit the payload to OUA 504. OUA 504 can, at 522, forward this payload to KDS 502, which can respond, at 524A, by verifying the PSP signature and payload content and generating a response payload that contains a command to burn the electronic fuse to record the user consent. Verifying the PSP signature and payload content at 524A can involve identifying a valid and expected OUA and KMD certificates and PSN range and format. KDS 502 also can record the GPU data (e.g., serial number) in memory of KDS 502 at 524B. For example, recording this information at KDS 502 can be added if it turns out that RMAs are beyond expectations and a data trail and connection needs to be established to align RMAs with extreme overclocking enabled board enablements. For example, after the response has been accepted, the electronic fuse authorization can be triggered by communication with KDS 502 through the previously established secure channel if the OUA 504 end user has responded with appropriate input. Since KDS 502 is stateless after the authorization has been issued, the communication can then be completed. If the completion of the communication is not achieved within a set time period (e.g., 20 sec), then the communication can be reset.

KDS 502 can, at 526, transmit a message containing the response payload to OUA 504 which can forward the message, at 528, to PSP 506. PSP 506 can, at 530, verify the signature using the KDS 502 HMAC key and, if the verification of the response payload is successful, execute a command to burn the electronic fuse, thus recording the user consent. At 532, PSP 506 can further transmit an acknowledgement to OUA 504 that the command is complete. OUA 504 can respond to the acknowledgement by transmitting, at 534, a query of the electronic fuse state to PSP 506. PSP 506 can respond to this query, at 536, by reading the SPI ROM fuse bit and returning the fuse state at 538. The OUA 504 can then overclock the GPU in response to the returned fuse state. In some implementations, the procedures at 534-538 can be used each time the OUA overclocks the GPU. Thus, the burning of the electronic fuse by PSP 506 can both permanently mark the GPU as user-enabled for overclocking and enable OUA 504 to overclock the GPU. Alternatively or additionally, the extreme overclock enable status can be discoverable through end user accessible tools (e.g., Radeon Settings) and stored in owner certificate authority (OCA) collection data of the KMD. This stored status can identify, for example, that stability issues reported through Microsoft telemetry are likely based on and end user's overclocking attempts and/or to identify registered timeout detection and recoveries (TDRs) and other errors from the overall tracking performed at Microsoft.

FIG. 6 illustrates example systems 600 and 650 for enabling a feature of a semiconductor device. For example, system 600 can perform extreme overclocking parameter control. After the extreme overclocking has been enabled, a PSP 602 of a GPU 604 can provide that status to Radeon Settings (e.g., which may have a clearly visible UI status) and enable a dedicated API for a KMD 606 and OUA 608 to target and to allow querying and setting the various parameters. For example, OUA 608 can send a request through KMD 606 to PSP 602 with the necessary parameters to query and set. OUA 608 can be identified through its Authenticode signature certificate 610 (e.g., a hash stored in a certificate store 612 of OUA 608) and be validated for integrity via KMD 606 utilizing the WinVerifyTrust( ) provided certificate checks and information. PSP 602 can be aware of the certificate due to the enablement step and can confirm that the request came from an approved OUA 608 path via KMD 606 and can sign the KMD 606 provided payload.

The OUA 608 controlling the overclocking enablement can avoid requiring any private secrets to authenticate itself to enable overclocking as it can establish a secured channel between two secured endpoints (e.g., PSP 602 and a KDS). Its identity can be tied to the Windows application signature certificate (e.g., Authenticode), which either can be embedded into the binary via a manifest or, if the binary application is installed as part of a driver package (e.g., as in the case of KMD 606), can be associated with the driver package's setup information (INF) catalog (CAT) file. The root of trust (e.g., PSP 602) can be chained to the Authenticode signature certificate and can provide an external and independent path to a certification Trust Authority (e.g., Verisign, Thawte, etc.) from which the derivate certificate has been issued. Microsoft Windows can provide the certificate verification as part of the WinVerifyTrust( ) call use. This verification mechanism can support a variety of commands/actions, such as actions that test against the Windows hardware quality lab (WHQL) signature, actions that test against a specific HTTPS certificate store, and/or actions that test against a generic Authenticode policy provider (e.g., "signed by trusted authority"), which is in the WINTRUST_ACTION_GENERIC_VERIFY_V2 action. The WHQL signature for KMD 606 and generic Authenticode signature certificate 610 for OUA 608 can be expected by some implementations, but other implementations can choose different trust authority roots as needed. Alternatively or additionally, if the WinVerifyTrust( ) results need to be further asserted, then the Windows CryptoAPI can be used by software to validate the integrity of the signed application binary and associated signed DLL and other support data.

System 650 can perform certificate validation using a root of trust certificate 652A and 652B, a manufacturer's certificate 654A and 654B, a KMD certificate 656, a user mode driver (UMD) certificate 658, and an OUA certificate 660. For example, the client components utilizing the Windows certificate retrieval and verification (KMD) of OUA and KMD can leverage the Windows certificate infrastructure. This information can be leveraged to validate that the Authenticode signature of the relevant application and driver files have been signed by the appropriate authorized signing authority, which in this case can be anchored in the manufacturer's assigned company certificate 654A using an appropriate signature encoding (typically SHA256). The authorization can be delegated by certificate trust infrastructure from a well-known root of trust certificate 652A that delegates the authority to the manufacturer's signing certificate 654A. The file certificate is dependent on the actual file content. Thus, for the purpose of validating the consistency of the client system's application files and drivers after the infrastructure outlined above, the KMD can retrieve the parent public certificate 654A for the manufacturer from the various files under investigation (e.g., OUA file components, ensuring that all files are using the same certificate identifying the manufacturer as the signing authority). The KMD can also transfer that parent certificate information via the https connection to the KDS session. The KMD is validated by the local WinVerifyTrust( ) call against the Microsoft WHQL certificate already locally (e.g., with the Windows infrastructure validating it against that chain of trust in the infrastructure). Thus, the signed payload to the KDS can simply contain the manufacturer certificate related information alongside the status of the KMD validation, but not the KMD signature certificate 656 itself. KDS then can independently validate, through cryptographic measures, that the content of the manufacturer's certificate 654A sent by the client are valid and are of the expected authority. This can be accomplished by validating the signed certificate 654B received from the client and, on the KDS side, independently walking the chain of trust upwards until the root of trust certificate 652B has been reached. This root of trust certificate 652B and the intermediate chain of trust signatures, if validated, can indicate to the KDS that the client is unaltered, which can fulfill the requirements for the authorization to burn the fuse.

Three separate components can be involved in the process of enabling the electronic fuse burning protocol and each can have their specific responsibilities. One of these components can be the GPU PSP on the end user client system, which can be accessed via the graphics driver's KMD. Another of these components can be the authorization webservice/KDS, which can be the other endpoint in the secured communication to track and approve the end-user authorization, and the overclocking utility application (OUA), which is responsible initiating the communication with both ends and eventually passing the signed buffers back and forth between PSP/KMD and web service. After the session key has been established between the PSP and web service, the buffer payload can be signed by the PSP and KDS and validated on the other side of the communication as outlined in the flow diagram above. The OUA and KMD can follow the outlined flow to provide a buffer with a payload that includes detailed board information, GPU serial number, OUA Authenticode certificate with windows based integrity check, KMD Authenticode certificate with windows based integrity check, and status of the end user response.

The PSP can utilize this information as part of the challenge payload, forward it to KDS, receive a response, and forward the approved authentication message for burning the electronic fuse in a KDS signed buffer to the PSP, which can then burn the electronic fuse. The (e.g., binary) payload data within the secured channel can, for simplicity in the communication with the KDS, be encoded (e.g., as ASCII HEXDUMP data). The general communication mechanism can be similar to established protocols (e.g., hardware detection tool (HDT) Secure Debug Unlock, core feature enable, etc.) and functionality on the PSP and KDS can be reused from these mechanisms. Following receipt of the response to the challenge payload and/or burning of the electronic fuse, the communication for activating extreme overclocking can be closed.

To support the electronic fuse burning authorization sequence, the PSP trusted application can be configured to support the following distinct commands:

1. "Initiate Session Key request challenge" payload, which may contain supporting ancillary information (e.g., detailed board information payload, OUA and KMD certificates);
2. "Receive challenge response" payload;
3. Receive Authorization key (causes burning of the electronic fuse);
4. An additional command supported by the PSP that allows the OUA and the Radeon Settings application to query the current electronic fuse state as a system local request between the OUA/KMD and the PSP;
5. Return electronic fuse state.

Similarly, the KDS can be configured to support the following requests:

1. Challenge GET;
2. Session key GET (+send challenge from PSP in ASCII HEX), for which a response contains a payload with a signed authorization key;
3. Authorization GET (+OUA information from message box user response), returns authorization;
4. Close GET (+status of the now active eFuse).

If, during the communication sequence for the electronic fuse burning authorization any error occurs or any of the expected responses do not occur within a predetermined time (e.g., 20 sec) the sequence can be reset, resetting both the PSP and KDS state to the start of the sequence.

As set forth above, the disclosed systems and methods can enable a feature of a semiconductor device. For example, by receiving a command to enable a feature (e.g., overclocking) of a semiconductor device (e.g., graphics processing unit (GPU)) and responding to the command by burning an electronic fuse of the semiconductor device, a trusted microprocessor (e.g., hardware root of trust) of the semiconductor device can permanently mark the semiconductor device as user-enabled for the feature and also enable the feature. In some implementations, this capability can be realized using an application (e.g., overclocking utility) that receives a user selection to enable the feature (e.g., overclocking the GPU at the expense of voiding the GPU warranty). Then the application can securely communicate with the trusted microprocessor and a network accessible secure service to obtain an authorization (e.g., certificate) and as well as the command and relay the command to the trusted microprocessor. Once the feature has been enabled, a kernel mode driver of a user device that includes the semiconductor device can provide the feature based on a state of the burned fuse and the authorization provided to the application. In this way, the disclosed systems and methods can avoid employing overly restrictive security mechanisms on end-user-systems while providing a more robust and secure solution than can be realized using end-user system local software.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device, comprising: circuitry configured to:
   receive a command to enable a feature of a semiconductor device; and
   in response to the command to enable the feature,
   enable the feature of the semiconductor device; and
   detectably record receipt of the command to enable the feature, wherein detectably recording the receipt comprises burning an electronic fuse of the semiconductor device.

2. The computing device of claim 1, wherein burning the electronic fuse enables the feature.

3. The computing device of claim 1, wherein the computing device corresponds to a hardware root of trust of the semiconductor device.

4. The computing device of claim 1, wherein the computing device receives the command by interacting, via an application configured to provide the feature, with a network accessible secure service.

5. The computing device of claim 4, wherein the network accessible secure service is configured to:
   establish a secure connection with an operating system in communication with the semiconductor device and running the application;
   use a cryptographic signature to validate an integrity of a software infrastructure dealing with a setting of the feature as user-enabled;
   receive a user selection to enable the feature from the application; and
   securely instruct the computing device to burn the electronic fuse.

6. The computing device of claim 1, wherein the semiconductor device corresponds to a graphics processing unit and the feature corresponds to overclocking of the graphics processing unit.

7. A system comprising:
   a semiconductor device including a trusted microprocessor and an electronic fuse; and
   an operating system in communication with the semiconductor device and configured to run an application that provides a feature of the semiconductor device,
   wherein the trusted microprocessor is configured to:
   receive a command to enable the feature of the semiconductor device; and
   respond to receipt of the command to enable the feature by:
   enabling the feature of the semiconductor device; and
   detectably recording receipt of the command to enable the feature, wherein detectably recording the receipt comprises burning the electronic fuse.

8. The system of claim 7, wherein burning the electronic fuse enables the feature.

9. The system of claim 7, wherein the trusted microprocessor corresponds to a hardware root of trust of the semiconductor device.

10. The system of claim 7, wherein the trusted microprocessor receives the command by interacting, via the application, with a network accessible secure service.

11. The system of claim 10, wherein the network accessible secure service is configured to:
   establish a secure connection with the operating system;
   use a cryptographic signature to validate an integrity of a software infrastructure dealing with a setting of the feature as user-enabled;
   receive a user selection to enable the feature from the application; and
   securely instruct the trusted microprocessor to burn the electronic fuse.

12. The system of claim 7, wherein the semiconductor device corresponds to a graphics processing unit and the feature corresponds to overclocking of the graphics processing unit.

13. A computer-implemented method comprising:
   receiving, by at least one processor of a semiconductor device, a command to enable a feature of the semiconductor device; and
   in response to the command to enable the feature,
   enabling the feature of the semiconductor device; and
   detectably recording receipt of the command to enable the feature, wherein detectably recording the receipt comprises burning, by the at least one processor, an electronic fuse of the semiconductor device.

14. The computer-implemented method of claim 13, wherein burning the electronic fuse enables the feature.

15. The computer-implemented method of claim 13, wherein the at least one processor corresponds to a hardware root of trust of the semiconductor device.

16. The computer-implemented method of claim 13, wherein the at least one processor receives the command by interacting, via an application configured to provide the feature, with a network accessible secure service.

17. The computer-implemented method of claim 16, wherein the network accessible secure service is configured to:
   establish a secure connection with an operating system in communication with the semiconductor device and running the application;
   use a cryptographic signature to validate an integrity of a software infrastructure dealing with a setting of the feature as user-enabled;
   receive, from the application, a user selection to enable the feature; and
   securely instruct the at least one processor to burn the electronic fuse.

18. The computing device of claim 1 further comprising circuitry configured to:
   query a state of the electronic fuse; and
   in response to detecting that the state of the electronic fuse is burned, determine that the feature was user-enabled.

19. The system of claim 7, wherein the trusted microprocessor is further configured to:
   query a state of the electronic fuse; and
   in response to detecting that the state of the electronic fuse is burned, determine that the feature was user-enabled.

20. The computer-implemented method of claim 13, further comprising:
   querying a state of the electronic fuse; and
   in response to detecting that the state of the electronic fuse is burned, determining that the feature was user-enabled.

* * * * *